(12) United States Patent
Suzuki et al.

(10) Patent No.: US 10,556,223 B2
(45) Date of Patent: *Feb. 11, 2020

(54) EXHAUST GAS PURIFYING CATALYST

(71) Applicants: Hiromasa Suzuki, Toyota (JP); Takeru Yoshida, Toyota (JP); Masahide Miura, Toyota (JP); Yuki Aoki, Toyota (JP); Isao Chinzei, Toyota (JP); Yoshinori Saito, Kakegawa (JP); Daisuke Ochiai, Toyota (JP); Mitsuyoshi Okada, Toyota (JP); Toshitaka Tanabe, Nagakute (JP); Akihiko Suda, Nagakute (JP); Masanao Sato, Kakegawa (JP); Akiya Chiba, Kakegawa (JP); Akira Morikawa, Nagakute (JP); Hirotaka Ori, Kakegawa (JP)

(72) Inventors: Hiromasa Suzuki, Toyota (JP); Takeru Yoshida, Toyota (JP); Masahide Miura, Toyota (JP); Yuki Aoki, Toyota (JP); Isao Chinzei, Toyota (JP); Yoshinori Saito, Kakegawa (JP); Daisuke Ochiai, Toyota (JP); Mitsuyoshi Okada, Toyota (JP); Toshitaka Tanabe, Nagakute (JP); Akihiko Suda, Nagakute (JP); Masanao Sato, Kakegawa (JP); Akiya Chiba, Kakegawa (JP); Akira Morikawa, Nagakute (JP); Hirotaka Ori, Kakegawa (JP)

(73) Assignees: TOYOTA JIDOSHA KABUSHIKI KAISHA, Toyoto-shi, Aichi (JP); CATALER CORPORATION, Kakegawa-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/534,841

(22) PCT Filed: Dec. 11, 2015

(86) PCT No.: PCT/JP2015/006203
§ 371 (c)(1),
(2) Date: Jun. 9, 2017

(87) PCT Pub. No.: WO2016/092862
PCT Pub. Date: Jun. 16, 2016

(65) Prior Publication Data
US 2017/0348674 A1 Dec. 7, 2017

(30) Foreign Application Priority Data
Dec. 12, 2014 (JP) ................................ 2014-251878

(51) Int. Cl.
*F01N 3/10* (2006.01)
*B01D 53/94* (2006.01)
(Continued)

(52) U.S. Cl.
CPC ............ *B01J 23/63* (2013.01); *B01D 53/945* (2013.01); *B01J 23/002* (2013.01); *B01J 23/10* (2013.01);
(Continued)

(58) Field of Classification Search
CPC ...... B01J 23/63; B01J 37/0236; B01J 37/031; B01J 37/08; B01J 35/04; B01J 37/0248;
(Continued)

(56) References Cited
U.S. PATENT DOCUMENTS 8,853,120 B2   10/2014   Aoki et al.
2010/0061903 A1   3/2010   Kohara et al.
(Continued)

FOREIGN PATENT DOCUMENTS

CN   102131582 A   7/2011
CN   103442804 A   12/2013
(Continued)

OTHER PUBLICATIONS

Office Action dated Oct. 10, 2018 from the U.S. Patent & Trademark Office in copending U.S. Appl. No. 15/534,794.
(Continued)

*Primary Examiner* — Anthony J Zimmer
(74) *Attorney, Agent, or Firm* — Sughrue Mion, PLLC

(57) ABSTRACT

The object of the present invention is to provide an exhaust gas purifying catalyst that can achieve high purification
(Continued)

performance while suppressing $H_2S$ emissions. The object is solved by an exhaust gas purifying catalyst in which the top layer of a catalyst coating layer comprises a ceria-zirconia composite oxide having a pyrochlore-type ordered array structure, in which the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element):(zirconium) is within the range from 43:57 to 48:52.

5 Claims, 6 Drawing Sheets

(51) Int. Cl.

| | |
|---|---|
| *B01J 23/00* | (2006.01) |
| *B01J 23/10* | (2006.01) |
| *B01J 23/63* | (2006.01) |
| *B01J 35/00* | (2006.01) |
| *B01J 35/04* | (2006.01) |
| *B01J 35/10* | (2006.01) |
| *B01J 37/02* | (2006.01) |
| *B01J 37/03* | (2006.01) |
| *B01J 37/08* | (2006.01) |
| *C01F 17/00* | (2006.01) |
| *C01G 25/00* | (2006.01) |
| *C01G 25/02* | (2006.01) |
| *B01J 27/053* | (2006.01) |

(52) U.S. Cl.
CPC ......... *B01J 35/002* (2013.01); *B01J 35/0006* (2013.01); *B01J 35/04* (2013.01); *B01J 35/1009* (2013.01); *B01J 37/0236* (2013.01); *B01J 37/0244* (2013.01); *B01J 37/0248* (2013.01); *B01J 37/03* (2013.01); *B01J 37/031* (2013.01); *B01J 37/08* (2013.01); *C01F 17/0043* (2013.01); *C01G 25/006* (2013.01); *F01N 3/10* (2013.01); *F01N 3/101* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2066* (2013.01); *B01D 2255/407* (2013.01); *B01D 2255/908* (2013.01); *B01D 2255/9022* (2013.01); *B01D 2258/014* (2013.01); *B01J 27/053* (2013.01); *B01J 2523/00* (2013.01); *C01P 2002/36* (2013.01); *C01P 2002/50* (2013.01); *C01P 2004/61* (2013.01); *F01N 2510/06* (2013.01); *F01N 2570/24* (2013.01); *Y02T 10/22* (2013.01)

(58) Field of Classification Search
CPC .... B01J 35/1009; B01J 35/002; B01J 23/002; B01J 37/03; B01J 23/10; B01J 35/0006; B01J 37/0244; B01J 2523/00; B01J 27/053; F01N 3/10; F01N 3/101; F01N 2510/06; F01N 2570/24; C01G 25/006; C01G 25/02; C01F 17/0043; B01D 53/945; B01D 2255/1021; B01D 2255/2061; B01D 2255/908; B01D 2255/2063; B01D 2255/407; B01D 2258/014; B01D 2255/1025; B01D 2255/2066; B01D 2255/9022; B01D 2255/1023; Y02T 10/22; C01P 2004/61; C01P 2002/50; C01P 2002/36
See application file for complete search history.

(56) References Cited

U.S. PATENT DOCUMENTS

| | | |
|---|---|---|
| 2011/0020201 A1 | 1/2011 | Luo et al. |
| 2011/0113754 A1 | 5/2011 | Kohara et al. |
| 2012/0021899 A1 | 1/2012 | Nobukawa et al. |
| 2013/0029840 A1 | 1/2013 | Morikawa et al. |
| 2013/0310248 A1 | 11/2013 | Aoki et al. |
| 2014/0037524 A1 | 2/2014 | Mikita et al. |
| 2018/0236401 A1 | 8/2018 | Chinzei et al. |

FOREIGN PATENT DOCUMENTS

| | | |
|---|---|---|
| EP | 2 671 638 A1 | 12/2013 |
| JP | 2009-285604 A | 12/2009 |
| JP | 2010-201284 A | 9/2010 |
| JP | 2010-260046 A | 11/2010 |
| JP | 2012-024701 A | 2/2012 |
| WO | 2009/144568 A1 | 12/2009 |
| WO | 2010/001226 A1 | 1/2010 |
| WO | 2012/052828 A1 | 4/2012 |
| WO | 2012/101505 A1 | 8/2012 |
| WO | 2012/105454 A1 | 8/2012 |
| WO | 2014/199219 A1 | 12/2014 |
| WO | 2015/019156 A1 | 2/2015 |
| WO | 2015/049575 A1 | 4/2015 |

OTHER PUBLICATIONS

Notice of Allowance dated Apr. 9, 2019 from the U.S. Patent & Trademark Office in copending U.S. Appl. No. 15/534,794; 11 pages.
Notice of Allowance dated Sep. 23, 2019 from the U.S. Appl. No. 15/534,794.

EXHAUST GAS PURIFYING CATALYST

CROSS REFERENCE TO RELATED APPLICATIONS

This application is a National Stage of International Application No. PCT/JP2015/006203 filed Dec. 11, 2015, claiming priority based on Japanese Patent Application No. 2014-251878 filed Dec. 12, 2014, the contents of all of which are incorporated herein by reference in their entirety.

TECHNICAL FIELD

The present invention relates to an exhaust gas purifying catalyst. More specifically, the present invention relates to an exhaust gas purifying catalyst having a plurality of catalyst coating layers, in which the top layer contains a pyrochlore-type ceria-zirconia composite oxide comprising a predetermined additional element.

BACKGROUND ART

Exhaust gas discharged from internal combustion engines such as vehicle engines contains hazardous gases such as carbon monoxide (CO), nitrogen oxides (NOx), and unburned hydrocarbon (HC). An exhaust gas purifying catalyst (i.e., so-called three-way catalyst) capable of decomposing such hazardous gas contains, as a co-catalyst having oxygen storage capacity (OSC), a ceria-zirconia composite oxide or the like. A material having oxygen storage capacity (OSC material) has an effect of suppressing decrease in purification ratio due to variation in the exhaust gas composition by absorbing/releasing oxygen and thereby controlling the air-fuel ratio (A/F) in a micro space.

In order to improve purification performance of an exhaust gas purifying catalyst, an OSC material is required to have a desirable oxygen absorption/release rate to respond to a sudden atmosphere change due to variation in A/F ratio and desirable oxygen storage capacity to maintain oxygen absorption/release capacity for a long period of time. In response to such requirements, for example. Patent Literature 1 suggests an exhaust gas purifying catalyst which exerts a high NOx purifying ability even after a durability test, which comprises a first oxygen storage material on which no noble metal is supported and which has a pyrochlore phase type regular array structure; and a second oxygen storage material which has a higher oxygen storage rate and a lower oxygen storage capacity than the first oxygen storage material, wherein a platinum group noble metal is supported on the second oxygen storage material.

Meanwhile, for example, a catalyst having two catalyst layers (i.e., upper and lower layers) that separately contain Pt and Rh, respectively, has been suggested in view of problematic deterioration of catalyst activity due to solid solution formation of metals in a NOx storage-reduction exhaust purification catalyst that stores NOx in lean atmosphere in which oxygen excess, and releases the stored NOx by changing the exhaust gas atmosphere into stoichiometric or rich atmosphere in which reducible components excess, and purifies NOx by reacting it with reducible components such as HC and CO by the effect of noble metals for reduction (Patent Literature 2 and 3).

CITATION LIST

Patent Literature

PTL 1: JP Patent Publication (Kokai) No. 2012-024701 A
PTL 2: Patent Literature 2: JP Patent Publication (Kokai) No. 2010-201284 A
PTL 3: Patent Literature 3: JP Patent Publication (Kokai) No. 2009-285604 A

SUMMARY OF INVENTION

Technical Problem

Fuels such as gasoline still contain small amounts of sulfur components, even though the amounts thereof are less than those in conventional fuels. In general, a sulfur component in a fuel is converted into sulfur dioxide by an exhaust gas purifying catalyst and emitted. However, when an exhaust gas atmosphere becomes a reduction atmosphere rich in HC, CO and the like, sulfur dioxide in an exhaust gas is reduced to hydrogen sulfide ($H_2S$) and emitted. In addition, since an OSC material such as ceria tends to adsorb sulfur oxides, improvement in oxygen absorption/release capacity and suppression of $H_2S$ emissions are mutually-exclusive events. Since even a minute amount of $H_2S$ has a bad odor, it is preferable to suppress $H_2S$ emissions as much as possible. However, it has been difficult to achieve the both of high oxygen absorption/release capacity and suppression of $H_2S$ emissions with using conventional materials. The object of the present invention is to provide an exhaust gas purifying catalyst which has high purification performance while $H_2S$ emission is suppressed.

Solution to Problem

The present inventors have studied the above problem and found that an exhaust gas purifying catalyst that achieves high purification performance while suppressing $H_2S$ emission can be provided by using a newly developed pyrochlore-type ceria-zirconia composite oxide comprising a predetermined additional element as an OSC material in a top layer of a catalyst coating layer. The present invention is summarized as below.

(1) An exhaust gas purifying catalyst comprising a substrate and a catalyst coating layer formed on the substrate, wherein
the catalyst coating layer at least has a lower layer and an upper layer, wherein the upper layer is formed on the lower layer and contacts directly with an exhaust gas flowing into the catalyst,
the lower layer comprises a carrier and a 1st noble metal catalyst supported by the carrier, wherein the 1st noble metal catalyst contains at least Pt or Pd,
the upper layer comprises a carrier, a 2nd noble metal catalyst supported by the carrier, and a ceria-zirconia composite oxide having a pyrochlore-type ordered array structure, wherein the 2nd noble metal catalyst contains at least Rh, wherein the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element):(zirconium) is within the range from 43:57 to 48:52.

(2) The exhaust gas purifying catalyst according to (1), wherein the additional element contained in the ceria-zirconia composite oxide is praseodymium.

(3) The exhaust gas purifying catalyst according to (1) or (2), wherein the upper layer contains the ceria-zirconia composite oxide in an amount ranges from 1 to 20 g/L in relation to the substrate volume.

(4) The exhaust gas purifying catalyst according to any one of (1) to (3), wherein the catalyst coating layer has:
a portion in which the upper layer is not formed at the upstream side end of the exhaust gas purifying catalyst; and another portion in which the lower layer is not formed at the downstream side end of the exhaust gas purifying catalyst.

(5) The exhaust gas purifying catalyst according to (4), wherein
the lower layer is formed over the area whose length is within the range from 75% to 85% of the total length of the substrate from the upstream side end of the exhaust gas purifying catalyst, and
the upper layer is formed over the area whose length is within the range from 75% to 85% of the total length of the substrate from the downstream side end of the exhaust gas purifying catalyst.

Advantageous Effects of Invention

According to the exhaust gas purifying catalyst of the present invention, a pyrochlore-type ceria-zirconia composite oxide comprising a predetermined additional element is used for a top layer of a catalyst coating layer. This enables the both of the improvement of oxygen absorption/release capacity and suppression of $H_2S$ emissions, which have been mutually-exclusive events, thereby making it possible to achieve high purification performance even at relatively low temperatures while suppressing $H_2S$ emissions.

This specification incorporates the content of the specification of Japanese Patent Application No. 2014-251878, for which priority is claimed to the present application.

DESCRIPTION OF EMBODIMENTS

Figure 1:
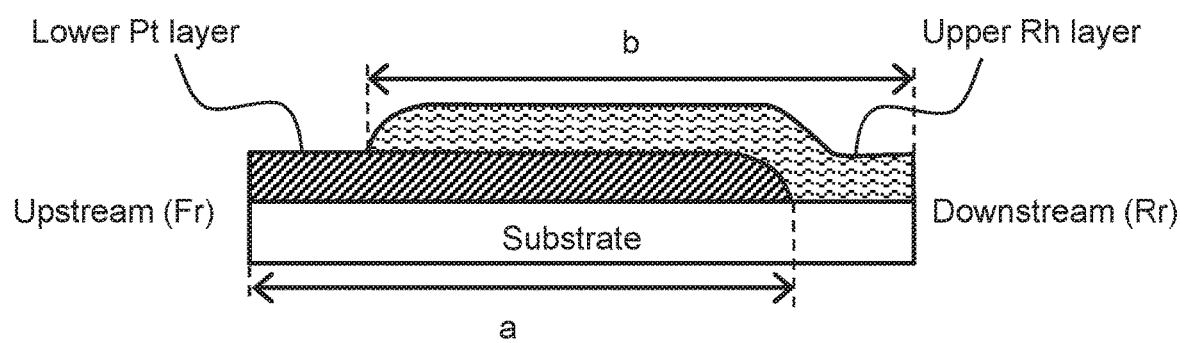
FIG. 1 schematically shows a cross-sectional view of a catalyst coating layer of the exhaust gas purifying catalyst of the present invention in one embodiment.

The exhaust gas purifying catalyst of the present invention comprises a substrate and a catalyst coating layer formed on the substrate, wherein the catalyst coating layer has at least a lower layer and an upper layer formed on the lower layer, and the upper layer comprises: a ceria-zirconia composite oxide containing at least one additional element selected from the group consisting of praseodymium (Pr), lanthanum (La), and yttrium (Y) and having a pyrochlore-type ordered array structure. The catalyst coating layer is composed at least of two layers, i.e., an upper layer and a lower layer; however, it may be composed of three or more layers if needed.

(Ceria-Zirconia Composite Oxide Contained in the Upper Layer of the Catalyst Coating Layer)

The ceria-zirconia composite oxide contained in the upper layer (the top layer if the catalyst coating layer has three or more layers) of the catalyst coating layer of the exhaust gas purifying catalyst of the present invention is characterized in that it has a pyrochlore-type ordered array structure and contains at least one additional element selected from the group consisting of praseodymium, lanthanum, and yttrium at 0.5 to 5.0 mol %, more preferably 1.0 to 3.0 mol % in relation to the total cation amount and the molar ratio of (cerium+additional element):(zirconium) is within the range from 43:57 to 48:52.

The ceria-zirconia composite oxide is a novel OSC material developed by the present inventors. It is characterized in that heat-induced deterioration are suppressed and sufficient oxygen absorption/release capacity can be exerted at temperatures as low as about 400° C. It is further characterized in that the oxygen absorption/release capacity is large while the oxygen absorption/release rate is relatively slow, and both of specific surface area and bulk density are small. Regarding the specific surface area of the ceria-zirconia composite oxide, the BET specific surface area calculated from an adsorption isotherm using the BET isothermal adsorption formula is preferably within the range from 0.1 to 2 $m^2/g$, particularly from 0.2 to 1 $m^2/g$.

In general, the phrase that a ceria-zirconia composite oxide "has a pyrochlore-type ordered array structure" means that a crystal phase having a pyrochlore-type ordered array consisting of cerium ions and zirconium ions (pyrochlore phase) is formed. The array structure of the pyrochlore phase can be identified with the 2θ angle peaks at positions of 14.5°, 28°, 37°, 44.5°, and 51° in an X-ray diffraction pattern obtained with CuKα radiation. The term "peak" used herein refers to a peak having a height from the baseline to the peak top of 30 cps or more. In addition, when the diffraction line intensity is obtained, calculation is performed by subtracting the average diffraction line intensity of θ=10° to 12° as a background from the value of each diffraction line intensity.

In a ceria-zirconia composite oxide having a pyrochlore-type ordered array structure, the content ratio of a crystal phase having a pyrochlore-type ordered array structure, which is calculated from a peak intensity ratio of X-ray diffraction pattern, is preferably 50% or more and particularly 80% or more of the entire crystal phase. Methods for preparing ceria-zirconia composite oxide having a pyrochlore-type ordered array structure are known to those skilled in the art.

The pyrochlore phase of a ceria-zirconia composite oxide ($Ce_2Zr_2O$) has oxygen defect sites. When oxygen atoms enter the sites, the pyrochlore phase changes to a κ phase ($Ce_2Zr_2O$). Meanwhile, the κ phase can change to a pyrochlore phase by releasing the oxygen atoms. The oxygen storage capacity of a ceria-zirconia composite oxide is due to the mutual phase transition between the pyrochlore phase and the κ phase which causes absorption/release of oxygen.

In X-ray diffraction (XRD) measurement of a crystal phase of a ceria-zirconia composite oxide with CuKα radiation, a diffraction line of 2θ=14.5° is derived from a (111) plane of an ordered phase (κ phase), and a diffraction line of 2θ=29° is overlapping of a diffraction line derived from a (222) plane of an ordered phase and a diffraction line derived from a (111) plane of a ceria-zirconia solid solution having no pyrochlore phase. Therefore, I(14/29) value, that is the intensity ratio of both diffraction lines, can be used as an index demonstrating the abundance ratio of the ordered phase. In addition, since a diffraction line of 2θ=28.5° is derived from a (111) plane of $CeO_2$ itself, I(28/29) value, that is the intensity ratio of the diffraction line of 2θ=28.5° and that of 2θ=29°, can be used as an index demonstrating the degree of phase separation of $CeO_2$ from the composite oxide. Here, based on the PDF card of a κ phase (PDF2: 01-070-4048) and the PDF card of a pyrochlore phase (PDF2: 01-075-2694), I(14/29) values of a complete κ phase and a complete pyrochlore phase can be calculated as 0.04 and 0.05, respectively.

The reason why a pyrochlore-type ceria-zirconia composite oxide used in the present invention has the above properties by containing at least one additional element selected from the group consisting of praseodymium, lanthanum, and yttrium is assumed to be as follows. In the case of praseodymium, since ΔG (Gibbs free energy) of a reduction reaction expressed by the formula: $Pr_6O_{11} \rightarrow 3Pr_2O_3+O_2$ is negative, a reduction reaction of $CeO_2$ expressed by the formula: $2CeO_2 \rightarrow Ce_2O_3+0.5O_2$ whose ΔG is positive is likely to occur. In the case of lanthanum and yttrium, since they are stable at trivalent state, they stabilize intracrystalline oxygen defects according to the principle of charge compensation.

Regarding durability, a pyrochlore-type ceria-zirconia composite oxide used in the present invention is characterized in that, when heated in the air at 1100° C. for 5 hours. I(14/29) and I(28/29) values obtained by X-ray diffraction measurement with CuKα radiation are 0.02 or more and 0.08 or less, respectively.

(The Lower Layer of the Catalyst Coating Layer)

The lower layer of the catalyst coating layer of the exhaust gas purifying catalyst of the present invention contains, as a 1st noble metal catalyst, Pt or Pd. The 1st noble metal catalyst may be Pt or Pd only, or a mixture of Pt and Pd only. Pt and Pd mainly contribute to purification by oxidation of CO and HC. The 1st noble metal catalyst is supported on a carrier and contained in such form. The carrier is not particularly limited. Examples of the carrier include arbitrary metal oxides generally used as catalyst carriers such as alumina ($Al_2O_3$), ceria ($CeO_2$), zirconia ($ZrO_2$), silica ($SiO_2$), and titania ($TiO_2$), and any combination thereof. Alumina is preferably used as a carrier for a 1st noble metal catalyst containing Pt or Pd in the lower layer of the catalyst coating layer. An alumina carrier may be a lanthana-added (lanthanum oxideadded) alumina carrier.

The lower layer of the catalyst coating layer comprises, as an OSC material, preferably a ceria-zirconia composite oxide, particularly preferably a ccria-zirconia composite oxide having a larger content of zirconia in relation to ceria (ZC). The expression "a lager content of zirconia in relation to ceria" used herein means that the proportion by weight of zirconia contained in a composite oxide is greater than that of ceria contained in the same. Regarding the abundance ratio, the weight ratio of ceria:zirconia in the ZC material is preferably within the range from 1:1.1 to 1:5, particularly 1:1.5 to 1:3. The ZC material is characterized in that it has oxygen absorption/release efficiency greater than that of a CZ material and thus it is less likely to influence noble metal activity.

(The Upper Layer of the Catalyst Coating Layer)

In the exhaust gas purifying catalyst of the present invention, the upper layer of the catalyst coating layer of contains, as a 2nd noble metal catalyst, Rh, and it may further contain Pt or Pd. A 2nd noble metal catalyst may be Rh only, a mixture of Rh and Pt only, a mixture of Rh and Pd only, or a mixture of Rh, Pt, and Pd only. Rh mainly contributes to reduction and purification of NOx. As in the case of the lower layer, a 2nd noble metal catalyst is supported on a carrier. Examples of a carrier that can be used include alumina ($Al_2O_3$), zirconia ($ZrO_2$), silica ($SiO_2$), titania ($TiO_2$), and any combination thereof. As a carrier for a 2nd noble metal catalyst containing Rh in the upper layer of the catalyst coating layer, zirconia, which can be easily heated because of its low specific heat, is preferable, and in particular, zirconia that is free of ceria is preferable because it prevents adsorption of sulfur oxide. In addition, the durability of the catalyst coating layer can be improved by mixing alumina having high thermostability into the catalyst coating layer, in addition to the carrier.

As described above, the upper layer of the catalyst coating layer comprises a ceria-zirconia composite oxide containing at least one additional element selected from the group consisting of praseodymium (Pr), lanthanum (La), and yttrium (Y) and having a pyrochlore-type ordered array structure. In order for the ceria-zirconia composite oxide to sufficiently exert its properties, the ceria-zirconia composite oxide is present in the upper layer of the catalyst coating layer in an amount of preferably 1 g/L or more, particularly preferably 2 g/L or more, and further preferably 4 g/L or more in relation to substrate volume. Since the upper layer, which is brought into direct contact with an exhaust gas flowing into a catalyst, contains the ceria-zirconia composite oxide, it facilitates the ceria-zirconia composite oxide to exert its properties. As described above, the ceria-zirconia composite oxide used in the present invention has a small specific surface area, and thus it is unlikely to adsorb sulfur oxide. As a result, it contributes to suppressing the amount of $H_2S$ generated. The ceria-zirconia composite oxide is present in the upper layer of the catalyst coating layer in an amount of preferably 20 g/L or less, particularly preferably 16 g/L or less, and further preferably 12 g/L or less in relation to substrate volume in terms of the balance between ability to purify NOx or the like, which is improved in proportion to the content of the ceria-zirconia composite oxide, and pressure loss in the catalytic converter and the amount of $H_2S$ emissions, which increase in proportion to the same. Typically, the ceria-zirconia composite oxide is preferably present in the upper layer of the catalyst coating layer in an amount of 1 to 20 g/L in relation to substrate volume.

(Substrate and Catalyst Coating)

A substrate used for the exhaust gas purifying catalyst of the present invention is not particularly limited, and a generally used material with a honeycomb structure having many cells can be used for such a substrate. Examples of such material include: ceramics materials having thermostability such as cordierite ($2MgO.2Al_2O_3.5SiO_2$), alumina, zirconia, and silicon carbide; and metal material in the form of metal foil such as stainless steel. It is possible to form a catalyst coating layer on a substrate by a well-known method comprising, for example, pouring slurry prepared by suspending material(s) in distilled water and a binder into a substrate and blowing an unnecessary portion of sully off using a blower.

In the exhaust gas purifying catalyst of the present invention, as shown in FIG. 1, it is preferable that the catalyst coating layer have a portion in which the upper layer is not formed at one end of the exhaust gas purifying catalyst of the upstream side of the flow of exhaust gas (Fr side) and another portion in which the lower layer is not formed at the other end of the exhaust gas purifying catalyst of the downstream side of the flow of exhaust gas (Rr side). By providing a portion in which the upper layer is not formed on the upstream side of the flow of the exhaust gas, it is possible to facilitate oxidation and purification of HC and CO in the exhaust gas by the lower layer containing Pt and Pd, as 1st noble metal catalysts. As a result of oxidation and purification of HC and CO on the upstream side, it is possible to prevent generation of a reduction atmosphere, which causes sulfur dioxide in the exhaust gas to become hydrogen sulfide ($H_2S$), thereby allowing suppression of $H_2S$ generation. In addition, by providing a portion in which the lower layer is not formed on the downstream side of the flow of the exhaust gas, it is possible to reduce the amount of coating on the downstream side of the catalyst on which sulfur tends to accumulate, thereby allowing further suppression of $H_2S$ generation. The lower layer is preferably formed such that the area thereof from the upstream side end of the exhaust gas purifying catalyst has a length accounting for 75% to 85%, particularly 78% to 82% of the full length of the substrate ("a" of FIG. 1), and the upper layer is preferably formed such that the area thereof from the downstream side end of the exhaust gas purifying catalyst has a length accounting for 75% to 85%, particularly 78% to 82% of the full length of the substrate ("b" of FIG. 1).

(Properties of the Exhaust Gas Purifying Catalyst of the Present Invention)

In a dual catalyst system combining a start-up catalyst (S/C, also referred to as a start-up converter) and an under-floor catalyst (UF/C, also referred to as an under-floor converter or underfloor catalyst) widely used in recent years, the exhaust gas purifying catalyst of the present invention is particularly suitable for use as the UF/C. In such dual catalyst system. S/C is installed close to an internal combustion engine and thus exposed to exhaust gas at high temperatures. Meanwhile, since UF/C is provided downstream of S/C in which the concentration of incoming exhaust gas is small and the temperature thereof is relatively low, a conventional OSC material (e.g., pyrochlore-type ZC material) could not sufficiently exert an oxygen absorption/release function. In addition, if S/C becomes unable to sufficiently function due to deterioration or breakdown, UF/C is required to exert sufficient exhaust gas purification ability by itself. The exhaust gas purifying catalyst of the present invention contains a pyrochlore-type ceria-zirconia composite oxide comprising predetermined additional elements in the upper layer of the catalyst coating layer and thereby fully utilize the properties of the ceria-zirconia composite oxide of exerting sufficient oxygen storage capacity even at low temperatures and suppressing $H_2S$ generation. The exhaust gas purifying catalyst of the present invention thereby achieves both of oxygen storage capacity and reduction of $H_2S$ odor, which have been mutually-exclusive events. Also, since the exhaust gas purifying catalyst of the present invention has thermostability, it is particularly preferable for use as UF/C.

EXAMPLES

The present invention is explained in more detail with reference to the Examples below. However, the present invention is not limited to the Examples.

1. Preparation of Pr-Added Pyrochlore ZC

First, the following were added to 1217 g of an aqueous solution containing ammonia in an amount 1.2 times the neutralization equivalent to obtain a coprecipitate: 442 g of a cerium nitrate aqueous solution (28% by mass calculated in terms of $CeO_2$), 590 g of a zirconium oxynitrate aqueous solution (18% by mass calculated in terms of $ZrO_2$), 100 g of an aqueous solution containing praseodymium nitrate in an amount corresponding to 1.2 g of $Pr_6O_{11}$, and 197 g of an aqueous solution containing hydrogen peroxide in an amount corresponding to 1.1 times the molar amount of cerium contained. The obtained coprecipitate was centrifuged and washed with ion-exchange water. The resulting coprecipitate was dried at 110° C. for 10 hours or more and sintered at 400° C. for 5 hours in the air. Thus, a solid solution containing cerium, zirconium, and praseodymium (a $CeO_2$—$ZrO_2$—$Pr_6O_{11}$ solid solution) was obtained. The obtained solid solution was pulverized by a pulverizer (product name: WonderBlender, AS ONE Corporation) such that they have a particle size equal or less than 75 μm after sieving to obtain a ceria-zirconia-praseodymium solid solution powder.

Next, 20 g of the obtained solid solution powder was packed into a polyethylene bag (volume: 0.05 L), the bag was deaerated, and the opening of the bag was heat-sealed. Subsequently, the bag was subjected to cold isostatic pressing (CIP) at a pressure (molding pressure) of 2000 kgf/cm² for 1 minute for molding using a cold isostatic pressing machine (product name: CK4-22-60, Nikkiso Co., Ltd.) to obtain a molded product of the ceria-zirconia-praseodymium solid solution powder. The size and weight of the molded product were as follows: length: 4 cm; width: 4 cm; average thickness: 7 mm; and weight: approximately 20 g.

Next, the obtained molded product (2 sheets) was placed in a crucible filled with 70 g of activated carbon (inner volume: 8 cm in diameter and 7 cm in height). The crucible was closed with a cover and placed in a high-speed heating electric furnace, followed by heating to 1000° C. for a heating-up period of 1 hour and heating to 1700° C. (reduction treatment temperature) for a heating-up period of 4 hours. The temperature was maintained for 5 hours. Then, the temperature was cooled to 1000° C. for a cooling period of 4 hours and then cooled to room temperature by natural heat radiation. The obtained reduction treatment product was heated at 500° C. for 5 hours in the air for oxidation to obtain a praseodymium-added pyrochlore-type ceria-zirconia composite oxide (Pr-added pyrochlore ZC) with a content ratio (molar ratio) of cerium:zirconium:praseodymium of 45:54:1. The obtained Pr-added pyrochlore ZC was pulverized to a particle size of 75 μm or less by sieving.

The obtained Pr-added pyrochlore ZC was heated at 1100° C. for 5 hours in the air (high temperature durability test). Then, in order to confirm whether or not the pyrochlore structure had been maintained, the crystal phase of the treated Pr-added pyrochlore ZC was assayed by X-ray diffraction. An X-ray diffraction apparatus (product name: RINT-2100; Rigaku Corporation) was used to measure X-ray diffraction patterns under the following conditions to obtain I(14/29) and I(28/29) values: CuKα radiation: 40 KV; 30 mA: 2θ=2°/minute.

Samples A to E of Pr-added pyrochlore ZC having different molar ratios of cerium:zirconium:praseodymium were prepared and subjected to high temperature durability tests, and then X-ray diffraction patterns were measured to obtain I(14/29) and I(28/29) values in the manner described above. Table 1 summarizes the results.

TABLE 1

| Pr-added pyrochlore ZC | Cation molar ratio Ce | Zr | Pr | I(14/29) value | I(28/29) value |
|---|---|---|---|---|---|
| A | 45 | 54 | 1 | 0.033 | 0.008 |
| B | 43.5 | 54 | 2.5 | 0.037 | 0.007 |
| C | 40.5 | 57 | 2.5 | 0.031 | 0.006 |
| D | 45.5 | 52 | 2.5 | 0.032 | 0.008 |
| E | 41 | 54 | 5 | 0.032 | 0.008 |

2. Preparation of Catalysts (1) Comparative Example 1: Double-Layered Catalyst Free of Pr-Added Pyrochlore ZC (a) Lower Pt Layer (Pt (0.2)/$Al_2O_3$ (25)+ZC (30))

Pt material supported by $Al_2O_3$ (material 1) was prepared using an $Al_2O_3$ carrier containing $La_2O_3$ (1% by mass) and platinum nitrate by an impregnation method. Next, material 1, a ceria-zirconia composite oxide with a molar ratio of cerium:zirconium of 46:54 (ZC) and an $Al_2O$ binder were added into distilled water with stirring and suspending to obtain slurry 1.

Slurry 1 was poured into a honeycomb-structured cordierite substrate for coating the substrate wall surface and then an unnecessary portion of slurry 1 was blown off using a blower. Coating was initiated from the upstream side of the flow of exhaust gas (Fr side) so that a coating was formed over the area whose length from the upstream side end is within 80% of the full length of the substrate (see FIG. 1, a=80%). The coating was controlled such that the contents of material 1 and ZC in the coating become 25 g/L (Pt: 0.2 g/L) and 30 g/L, respectively, relative to the volume of the substrate. After coating, moisture was removed using a dryer at 120° C. for 2 hours, and the resultant was subjected to sintering at 500° C. in an electric furnace for 2 hours.

(b) Upper Rh layer (Rh (0.12)/$ZrO_2$ (40)+$Al_2O_3$ (20))

Rh/$ZrO_2$ material supported by $ZrO_2$ (material 2) was prepared using a $ZrO_2$ carrier and rhodium nitrate by an impregnation method. Next, material 2, $Al_2O_3$, and an $Al_2O_3$ binder were added into distilled water with stirring and suspending to obtain slurry 2.

Slurry 2 was poured into a honeycomb-structured substrate, in which a coating is formed according to (a) above, and then an unnecessary portion of slurry 2 was blown off using a blower. Coating was initiated from the downstream side of the flow of exhaust gas (Rr side) so that a coating was formed over the area within 80% of the full length of the substrate from the downstream side end (see FIG. 1, b=80%). The coating was controlled such that the contents of material 2 and $Al_2O_3$ in the coating become 40 g/L (Rh: 0.12 g/L) and 20 g/L, respectively, relative to the volume of the substrate. After coating, moisture was removed using a dryer at 120° C. for 2 hours, and the resultant was subjected to sintering at 500° C. in an electric furnace for 2 hours.

(2) Examples 1 to 5

A catalyst was prepared in the manner described in Comparative Example 1 except that Pr-added pyrochlore ZC was further added when preparing slurry 2. The contents of Pr-added pyrochlore ZC in the coating were adjusted to 4 g/L, 8 g/L, 12 g/L, 16 g/L, and 20 g/L in Examples 1, 2, 3, 4, and 5, respectively in relation to the volume of the substrate.

(3) Comparative Example 2

A catalyst was prepared in the manner described in Comparative Example 1 except that Pr-added pyrochlore ZC with a molar ratio of cerium:zirconium:praseodymium of 45:54:1 (Table 1, A) was further added when preparing slurry 1. The content of Pr-added pyrochlore ZC in a coating was adjusted to 4 g/L in relation to the volume of the substrate.

(4) Comparative Examples 3 to 6

A catalyst was prepared in the manner described in Comparative Example 1 except that a ceria-zirconia composite oxide having a molar ratio of cerium:zirconium of 46:54 (ZC) was added when preparing slurry 2. The contents of ZC in a coating were adjusted to 8 g/L, 12 g/L, 16 g/L, and 20 g/L in Comparative Examples 3, 4, 5, and 6, respectively in relation to the volume of the substrate.

Table 2 lists the compositions of the lower and upper layers of the catalysts in Examples 1 to 5 and Comparative Examples 1 to 6.

TABLE 2

|  | Lower layer: Pt (0.2)/$Al_2O_3$ (25) + ZC (30) | Upper layer: Rh (0.12)/$ZrO_2$ (40) + $Al_2O_3$ (20) |
|---|---|---|
| Example 1 | — | +Pr-added pyrochlore ZC (4) |
| Example 2 | — | +Pr-added pyrochlore ZC (8) |
| Example 3 | — | +Pr-added pyrochlore ZC (12) |
| Example 4 | — | +Pr-added pyrochlore ZC (16) |
| Example 5 | — | +Pr-added pyrochlore ZC (20) |
| Comparative Ex. 1 | — | — |
| Comparative Ex. 2 | +Pr-added pyrochlore ZC (4) | — |
| Comparative Ex. 3 | — | +ZC (8) |
| Comparative Ex. 4 | — | +ZC (12) |
| Comparative Ex. 5 | — | +ZC (16) |
| Comparative Ex. 6 | — | + ZC (20) |

3. Evaluation (1) Durability Test

Each catalyst was attached to an exhaust system of a V-type 8-cylinder gasoline engine (4.3 L) and subjected to a 50-hour durability test at a catalyst bed temperature of 950° C. by conditions including switching feedback, fuel-cut, rich, and lean within one minute.

(2) Evaluation of the NOx Purification Ratio with Variable A/F Ratio

Each catalyst subjected to the durability test was installed, as a UF/C, in an actual engine provided with deteriorated S/C (Pd/Rh catalyst). The inlet gas temperature was set to 400° C. The amount of NOx emissions when A/F of the inlet gas atmosphere was caused to periodically swing between rich and lean regions (14.0-15.0) was measured.eb;normal (3) Evaluation of the Amount of H$_2$S Emissions During Acceleration Each catalyst was installed in an engine to which a fuel with a high sulfur content had been supplied such that the catalyst adsorbed sulfur. Next, the amount of hydrogen sulfide emissions during acceleration of the engine was measured. Evaluation was based on the rate with respect to the level in Comparative Example 1 in which Pr-added pyrochlore ZC or conventional ZC had not been added.

(4) Evaluation of the NOx Purification Ratio with Steady and Rich A/F Ratio

Each catalyst subjected to the durability test was installed, as a UF/C, in an actual engine provided with degraded S/C. The inlet gas temperature was set to 400° C. The amount of NOx emissions when A/F of the inlet gas atmosphere was maintained in a rich state was measured to calculate the purification ratio.

(5) Evaluation of Pressure Loss

Pressure loss (corresponding to the value at 25° C.) upon introduction of air at a constant flow rate (6 m$^3$/minute) into each catalyst was measured and the percentage of the pressure loss relative to the value in Comparative Example 1 was evaluated.

4. Results

Figure 2:
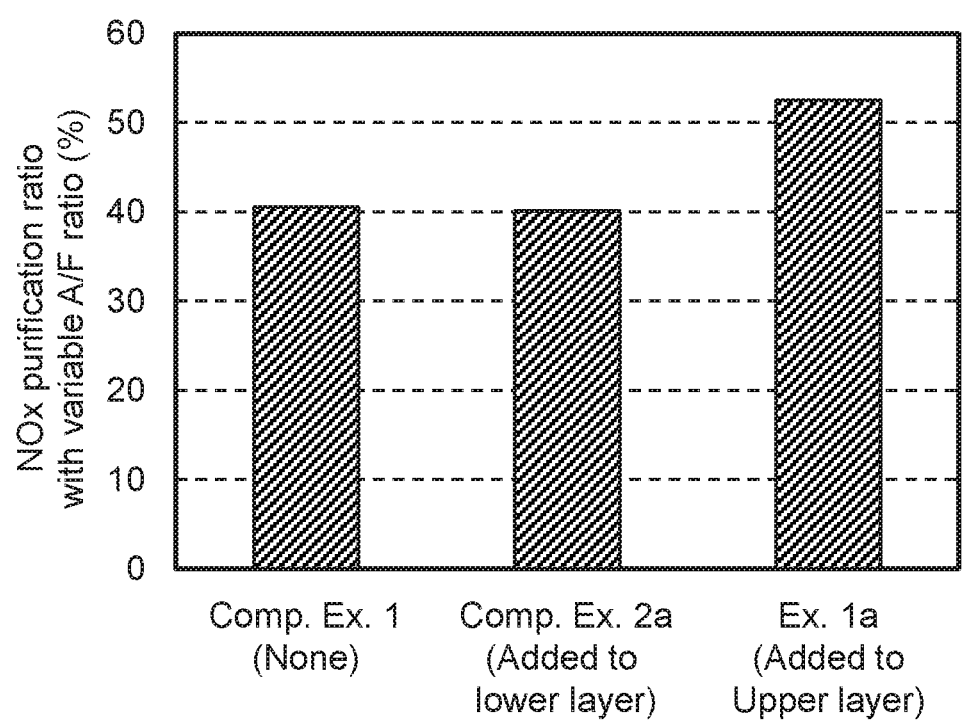
FIG. 2 is a graph showing the difference in effects between the case where Pr-added pyrochlore ZC is added to the lower layer and the case where it is added to the upper layer.

FIG. 2 is a graph showing a comparison of differences between the case where Pr-added pyrochlore ZC is added to the lower layer and the case where it is added to the upper layer. The catalysts of Example 1a and Comparative Example 2a were prepared in the manners described in Example 1 and Comparative Example 2, respectively, except that the content of Pr-added pyrochlore ZC in a coating was set to 5 g/L. The NOx purification ratio was found to improve only when Pr-added pyrochlore ZC was added to the upper layer. This was assumed because, since a gas purified by SIC is flowed into UF/C and the concentration of the gas flowing into UF/C was low, an addition of Pr-added pyrochlore ZC to the upper layer where more likely to react with the gas is more effective.

Figure 3:
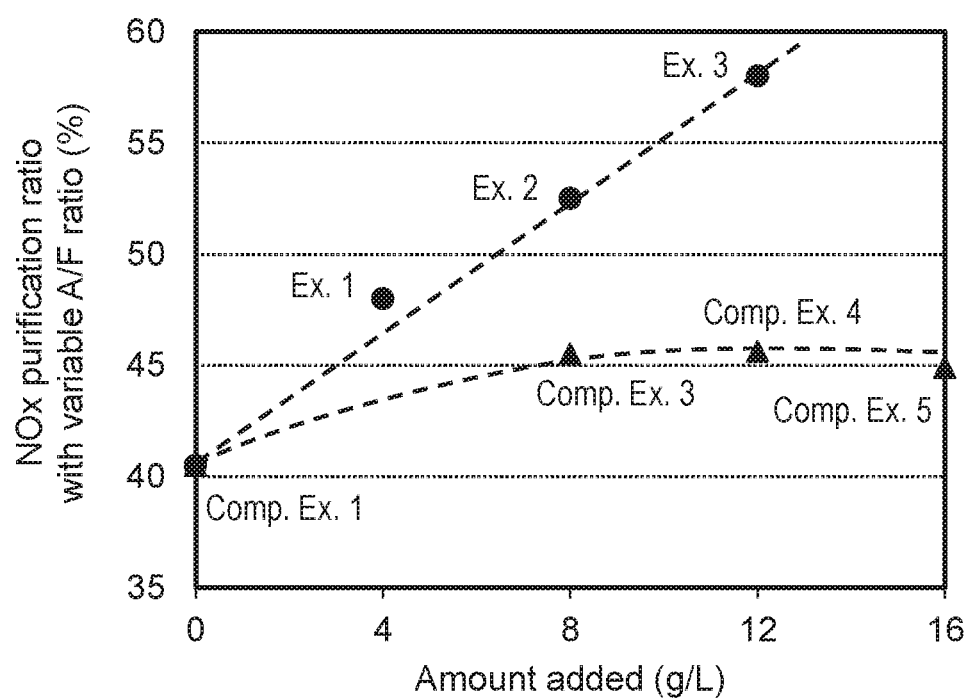
FIG. 3 is a graph showing the relationship between the amounts of Pr-added pyrochlore ZC or conventional ZC material added and the NOx purification ratio with variable A/F ratio.

FIG. 3 is a graph showing the relationship between the amounts of Pr-added pyrochlore ZC or conventional ZC material added and the NOx purification ratio with variable A/F ratio. When the conventional ZC material was added, there was no change in the NOx purification ratio even with the addition of a certain amount or more of the material. Meanwhile, when Pr-added pyrochlore ZC was added, the NOx purification ratio was improved in proportion to the amount added.

Figure 4:
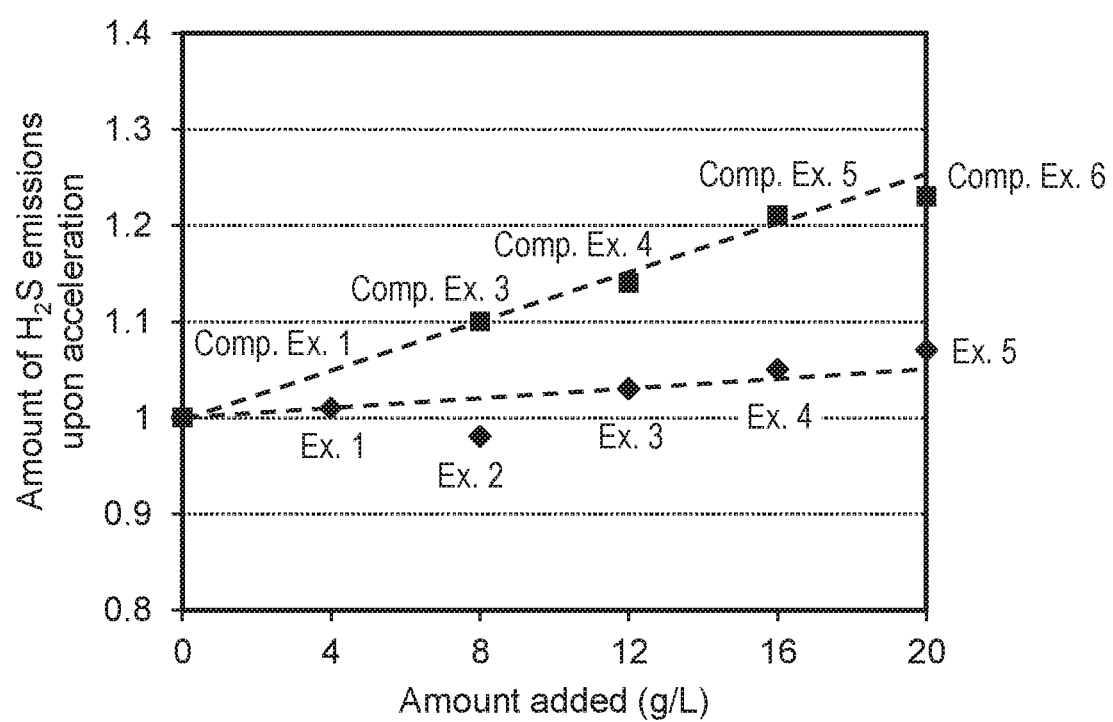
FIG. 4 is a graph showing the relationship between the amounts of Pr-added pyrochlore ZC or conventional ZC material added and the amount of $H_2S$ emissions.

FIG. 4 is a graph showing the relationship between the amounts of Pr-added pyrochlore ZC or conventional ZC material added and the amount of H$_2$S emissions. When the conventional ZC material was added, the amount of H$_2$S emissions increased in proportion to the amount added. Meanwhile, when Pr-added pyrochlore ZC was added, though the amount of H$_2$S emissions tended to increase with increases in the amount added; however, the increased amount of H$_2$S emissions was much less than that in the case of the conventional ZC material.

Figure 5:
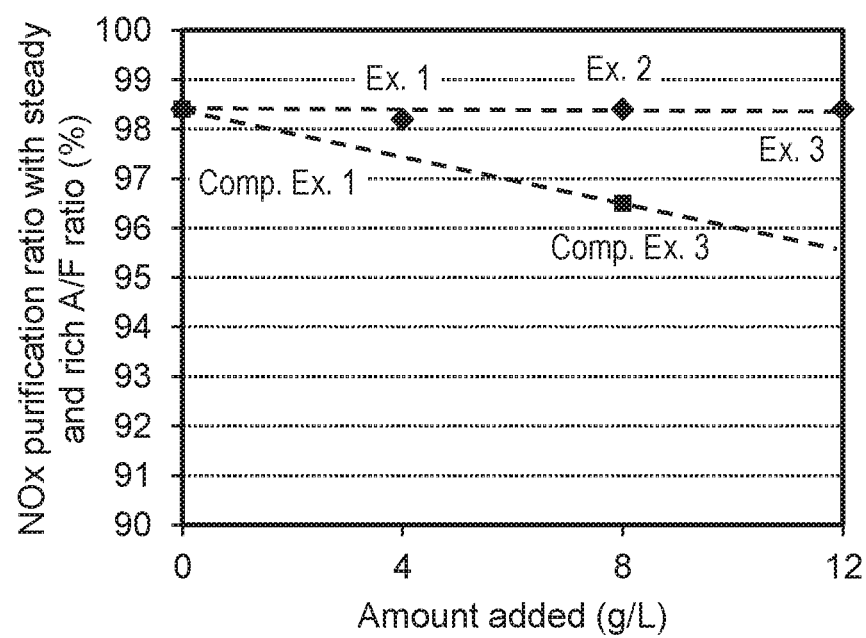
FIG. 5 is a graph showing the relationship between the amounts of Pr-added pyrochlore ZC or conventional ZC material added and the NOx purification ratio with steady and rich A/F ratio.

FIG. 5 is a graph showing the relationship between the amounts of Pr-added pyrochlore ZC or conventional ZC material added and the NOx purification ratio with steady and rich A/F ratio. When the conventional ZC material was added, the NOx purification ratio tended to decrease in response to the addition. Meanwhile, when the Pr-added pyrochlore ZC was added, such tendency was not observed at least when the amount added was 12 g/L or less.

Figure 6:
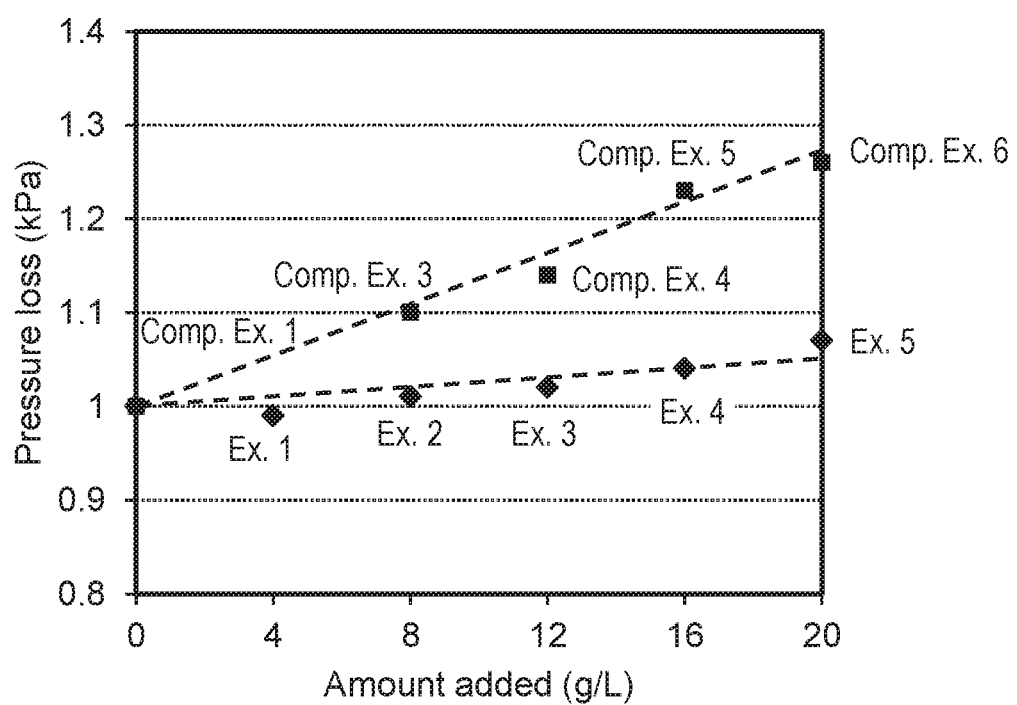
FIG. 6 is a graph showing the relationship between the amounts of Pr-added pyrochlore ZC or conventional ZC material added and pressure loss.

FIG. 6 is a graph showing the relationship between the amounts of Pr-added pyrochlore ZC or conventional ZC material added and pressure loss. When the conventional ZC material was added, the extent of pressure loss increased in proportion to the amount added. Meanwhile, when Pr-added pyrochlore ZC was added, though the extent of pressure loss tended to increase with an increase in the amount added; however, the pressure loss increased to a much lesser extent than that in the case of the conventional ZC material.

All references, including any publications, patents or patent applications cited in this specification are hereby incorporated by reference in their entirely.

The invention claimed is:

1. An exhaust gas purifying catalyst comprising a substrate and a catalyst coating layer formed on the substrate, wherein
   the catalyst coating layer at least has a lower layer and an upper layer, wherein the upper layer contacts directly with an exhaust gas flowing into the catalyst,
   the lower layer comprises a carrier and a first noble metal catalyst supported by the carrier, wherein the first noble metal catalyst contains at least Pt or Pd,
   the upper layer comprises a carrier, a second noble metal catalyst supported by the carrier, and a ceria-zirconia composite oxide having a pyrochlore ordered array structure, wherein the second noble metal catalyst contains at least Rh,
   wherein the ceria-zirconia composite oxide contains at least one additional element selected from the group consisting of praseodymium, lanthanum, and yttrium at 0.5 to 5.0 mol % in relation to the total cation amount, and the molar ratio of (cerium+additional element):(zirconium) is within the range from 43:57 to 48:52; and
   wherein the catalyst coating layer has:
      a portion in which the upper layer is not formed at the upstream side end of the exhaust gas purifying catalyst;
      a portion in which the upper layer is formed on the lower layer; and
      a portion in which the lower layer is not formed at the downstream side end of the exhaust gas purifying catalyst.

2. The exhaust gas purifying catalyst according to claim 1, wherein the additional element contained in the ceria-zirconia composite oxide is praseodymium.

3. The exhaust gas purifying catalyst according to claim 1, wherein the upper layer contains the ceria-zirconia composite oxide in an amount ranges from 1 to 20 g/L in relation to the substrate volume.

4. The exhaust gas purifying catalyst according to claim 2, wherein the upper layer contains the ceria-zirconia composite oxide in an amount ranges from 1 to 20 g/L in relation to the substrate volume.

5. The exhaust gas purifying catalyst according to claim 1, wherein
   the lower layer is formed over the area whose length is within the range from 75% to 85% of the total length of the substrate from the upstream side end of the exhaust gas purifying catalyst, and
   the upper layer is formed over the area whose length is within the range from 75% to 85% of the total length of the substrate from the downstream side end of the exhaust gas purifying catalyst.

* * * * *